United States Patent
Jonkmann et al.

(10) Patent No.: US 12,103,508 B2
(45) Date of Patent: Oct. 1, 2024

(54) VALVE ASSEMBLY AND PRESSURE CONTROL METHOD

(71) Applicant: Knorr-Bremse Systeme Fuer Nutzfahrzeuge GmbH, Munich (DE)

(72) Inventors: René Jonkmann, Stuttgart (DE); Alexander Krumrey, Muehlacker (DE); Andreas Koenig, Gemmrigheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 537 days.

(21) Appl. No.: 17/291,222

(22) PCT Filed: Oct. 17, 2019

(86) PCT No.: PCT/EP2019/078301
§ 371 (c)(1),
(2) Date: May 4, 2021

(87) PCT Pub. No.: WO2020/094362
PCT Pub. Date: May 14, 2020

(65) Prior Publication Data
US 2021/0402971 A1    Dec. 30, 2021

(30) Foreign Application Priority Data
Nov. 7, 2018    (DE) ..................... 10 2018 127 822.5

(51) Int. Cl.
*B60T 8/34*    (2006.01)
*B60T 8/36*    (2006.01)
(Continued)

(52) U.S. Cl.
CPC .............. *B60T 15/36* (2013.01); *B60T 8/342* (2013.01); *B60T 8/362* (2013.01); *B60T 13/662* (2013.01);
(Continued)

(58) Field of Classification Search
CPC ........ B60T 8/342; B60T 8/362; B60T 13/662; B60T 13/683; B60T 15/36; B60T 2270/10
See application file for complete search history.

(56) References Cited

U.S. PATENT DOCUMENTS 6,209,971 B1 *   4/2001   Ho ........................ B60T 8/3675
                                                          303/119.2
6,659,129 B1    12/2003   Kiel et al.
(Continued)

FOREIGN PATENT DOCUMENTS

DE     3906548 A1    9/1990
DE     4005608 A1    9/1991
(Continued)

OTHER PUBLICATIONS

International Search Report dated Feb. 17, 2020 for PCT/EP2019/078301.

*Primary Examiner* — Thomas W Irvin
(74) *Attorney, Agent, or Firm* — NORTON ROSE FULBRIGHT US LLP; Gerard A. Messina

(57) ABSTRACT

A valve assembly for providing pressure control at an output port, including: an input port and the output port; a pressure sink; a first valve with a first control connection; a second valve with a second control connection, in which the first valve and the second valve are arranged in series between the input port and the pressure sink and between which the output port branches off; a first control valve to connect the first control connection to the input port or vents the first control connection in a controllable manner; and a second control valve to connect the first control connection to the
(Continued)

output port or vents the first control connection in a controllable manner. Also described are a related anti-lock braking system, a commercial vehicle, and a method.

9 Claims, 4 Drawing Sheets

(51) Int. Cl.
*B60T 13/66* (2006.01)
*B60T 13/68* (2006.01)
*B60T 15/36* (2006.01)

(52) U.S. Cl.
CPC ......... *B60T 13/683* (2013.01); *B60T 2270/10* (2013.01)

(56) References Cited

U.S. PATENT DOCUMENTS

| | | | | |
|---|---|---|---|---|
| 10,011,253 B2* | 7/2018 | Knoke | | B60T 13/26 |
| 10,112,590 B2* | 10/2018 | Klik | | B60T 13/26 |
| 10,214,191 B2* | 2/2019 | Dreyer | | B60T 8/362 |
| 10,981,551 B2* | 4/2021 | Bialon | | B60T 13/683 |
| 11,673,539 B2* | 6/2023 | Hemmings | | B60T 15/52 303/20 |
| 11,731,600 B2* | 8/2023 | Roether | | B60T 13/683 303/118.1 |
| 2002/0167219 A1 | 11/2002 | Kemer et al. | | |
| 2009/0229932 A1* | 9/2009 | Reynolds | | B60T 15/54 188/153 R |
| 2017/0217412 A1* | 8/2017 | Knoke | | B60T 8/3675 |
| 2017/0253223 A1* | 9/2017 | Klik | | B60T 13/26 |
| 2017/0253224 A1* | 9/2017 | Dreyer | | B60T 8/342 |
| 2018/0370513 A1* | 12/2018 | Bialon | | B60T 8/3605 |
| 2021/0402967 A1* | 12/2021 | Roether | | F16K 11/22 |
| 2022/0048485 A1* | 2/2022 | Hemmings | | B60T 15/52 |

FOREIGN PATENT DOCUMENTS

| | | | | |
|---|---|---|---|---|
| DE | 19847311 A1 | 4/2000 | | |
| DE | 102010018614 B3 | 6/2011 | | |
| DE | 102010010606 A1 | 9/2011 | | |
| DE | 102015014205 A1 | 5/2017 | | |
| EP | 0208089 A1 | 1/1987 | | |
| EP | 1437278 A1 | 7/2004 | | |
| EP | 2927067 A2 | 10/2015 | | |
| EP | 2939892 A1 | 11/2015 | | |
| EP | 3623238 A1 * | 3/2020 | ............ | B60T 13/683 |
| JP | H0858546 A | 3/1996 | | |
| JP | H8230635 A | 9/1996 | | |
| JP | H8268255 A | 10/1996 | | |
| WO | 2017088959 A1 | 6/2017 | | |

* cited by examiner

VALVE ASSEMBLY AND PRESSURE CONTROL METHOD

FIELD OF THE INVENTION

The present invention relates to a valve assembly and a method for pressure control at an output port, in particular to a valve assembly with an optimized air flow to increase its service life.

BACKGROUND INFORMATION

In anti-lock braking systems (ABS) of pneumatic braking systems for commercial vehicles, the pressure is substantially reduced for a short time during an ABS intervention, in order to remove a locking of the wheels or to release the brake for a short time. These pressure reductions are implemented, for example, by an outlet valve, wherein a membrane in the outlet valve with the current configuration is significantly loaded by this/these short-term pressure reduction(s), which at the same time limits the service life of the valve assembly.

FIG. 3A and FIG. 3B show an example of such a valve assembly, which is used for ABS pressure control, wherein FIG. 3A shows a circuit diagram and FIG. 3B shows an exemplary implementation of the valve assembly.

In the valve assembly of FIG. 3A a first valve 10 and a second valve 20 are arranged in series between an input port P1 and a pressure sink S. The first valve 10 comprises a control input 12, which is connected to a first control valve 15. The first control valve 15 connects the control connection 12 of the first valve 10 either to the pressure sink S or to the input port P1. The second valve 20 also comprises a control input 22, which is controlled via a second control valve 25. The second control valve 25 connects the control connection 22 of the second valve 20 either to the pressure sink S or also to the input port P1. In the valve assembly shown, a control pressure line 40 is formed between the input port P1 and the second control valve 25, so that the pressure of the input port P1 is provided as a control pressure at the control input 22.

FIG. 3B shows a possible specific implementation of the interconnection arrangement from FIG. 3A. All pressure sinks S are connected here to a venting port P3, which is connected, for example, to an external environment. The first valve 10 comprises a first membrane 13 and the second valve 20 comprises a second membrane 23. The first membrane 13 opens and/or closes the connection between the input port P1 and the output port P2, wherein this is dependent on a pressure at the control connection 12. If the control connection 12 is ventilated, the first valve 10 closes, and if the control connection 12 is vented, the first valve opens 10. The second membrane 23 opens and/or closes the connection between the output port P2 and the pressure sink S, wherein this is dependent on a pressure at the control connection 22. If the control connection 22 is ventilated, the second valve closes 20, and if the control connection 22 is vented, the second valve opens 20. As shown schematically in FIG. 3A, the control pressure line 40 is formed as a channel between the input port P1 and the second control valve 25.

The first control valve 15 is biased in such a way that it vents the control connection 12 of the first valve 20 in the deenergized state. Therefore, the first valve 10 will automatically open in the event of a positive pressure at the input port P1. The second control valve 25 is biased so that it forwards the compressed air at the input port P1 via the control pressure line 40 to the control connection 22 of the second valve 20 in the deenergized state. Therefore, the pressure from the input port P1 is continuously applied to the rear side of the second membrane 23 if the second control valve 25 is not activated.

In the (default) position shown, the pressure of the input port P1 is forwarded via the opened first valve 10 to the output port P2. However, if an ABS intervention is to be carried out and thereby the pressure at the output port P2 is to be reduced for a short time, this is done by opening the second valve 20. As a result, the output port P2 is connected to the pressure sink S (P3). This can be done by energizing the second control valve 25, which causes venting of the control connection 22. Re-ventilating the control connection 22 using the second control valve 25 increases the pressure at the control connection 22 to the pressure of the input port P1 and thus for closing the second valve 20. Since the pressure at the input port P1 is often significantly greater than the pressure at the output port P2 when activating the ABS, this could lead to a considerable load on the second membrane 23, which separates the two pressures from each other. This significantly shortens the service life of the entire valve assembly. Replacing a single membrane is generally not economically sensible.

SUMMARY OF THE INVENTION

Therefore, there is a need for a valve assembly which allows fast and efficient pressure control at an output port, while nevertheless ensuring a long service life of the valves used. This is particularly important for autonomous driving, as the components used are continuously exposed to a high load and a significantly longer service life of the valve control device is desirable.

At least some of the problems mentioned above are solved by a valve assembly as described herein, and a method for pressure control as described herein. The further embodiments define further advantageous embodiments of the subject matter of the main descriptions herein.

Exemplary embodiments relate to a valve assembly for pressure control at an output port. The valve assembly comprises an input port, a pressure sink, a first valve with a first control connection and a second valve with a second control connection, which are arranged in series between the input port and the pressure sink and between which the output port branches off. The valve assembly also includes a first control valve, which connects the first control connection to the input port or vents the first control connection in a controllable manner, and a second control valve, which connects the first control connection to the output port or vents the first control connection in a controllable manner.

Optionally, the first control valve is a solenoid valve, which vents the first control connection when in the deenergized state. Also the second control valve can be a solenoid valve, wherein in the deenergized state the solenoid valve connects the second control connection to the output port.

Optionally, the first valve comprises a first membrane, which opens or closes a connection between the input port and the output port when the first valve is actuated. Likewise, the second valve may comprise a second membrane, which opens or closes a connection between the output port and the pressure sink when the second valve is actuated.

Optionally, the first membranes is biased (for example by a spring) to close the first valve when the input port is not under pressure. Optionally, the second membrane is biased (for example by another spring) in order to close the second valve when the output port is not under pressure.

Optionally, the valve assembly includes a choke to limit a flow (for example of air) via the input port.

Exemplary embodiments also relate to an anti-lock braking system for a vehicle brake, in particular for commercial vehicles, which has a previously defined valve assembly for pressure control at the output port, wherein the output port can be connected to a brake cylinder (of a brake of the vehicle).

Optionally, an ABS intervention can cause venting of the output port by the second valve and thus a short-term release of the brake.

Exemplary embodiments also relate to a commercial vehicle with a valve assembly as previously defined, or to an anti-lock braking system as previously defined.

Exemplary embodiments also relate to a method for controlling a pressure at an output port by a valve device as previously defined. The method involves:

Feeding a pressure via the input port through a first valve to an output port;

Closing the first valve to keep the pressure at the output port;

Connecting the output port to a pressure sink through a second valve to lower the pressure at the output port (for example briefly, in a jerky manner); and Interrupting the connection of the output port to the pressure sink by controlling the second valve with the pressure at the output port.

In contrast to conventional valve assemblies for pressure control, in which the control of the two membranes is carried out as standard with unregulated pressure (see FIG. 3A and FIG. 3B), in exemplary embodiments the load on the second membrane (outlet membrane) is lowered to a level of the first membrane (holding membrane) by the changed air flow. This achieves a much higher service life of the entire module. Basically, therefore, the outlet membrane is no longer significantly more heavily loaded than the inlet membrane. Cracks in the outlet membranes can be avoided or occur only significantly later by lowering the control pressure.

Exemplary embodiments of the present invention are better understood from the following detailed description and the enclosed drawings of the different exemplary embodiments, which should not be understood, however, in such a way that they limit the disclosure to the specific exemplary embodiments, but are used only for explanation and understanding.

DETAILED DESCRIPTION

Figure 1:
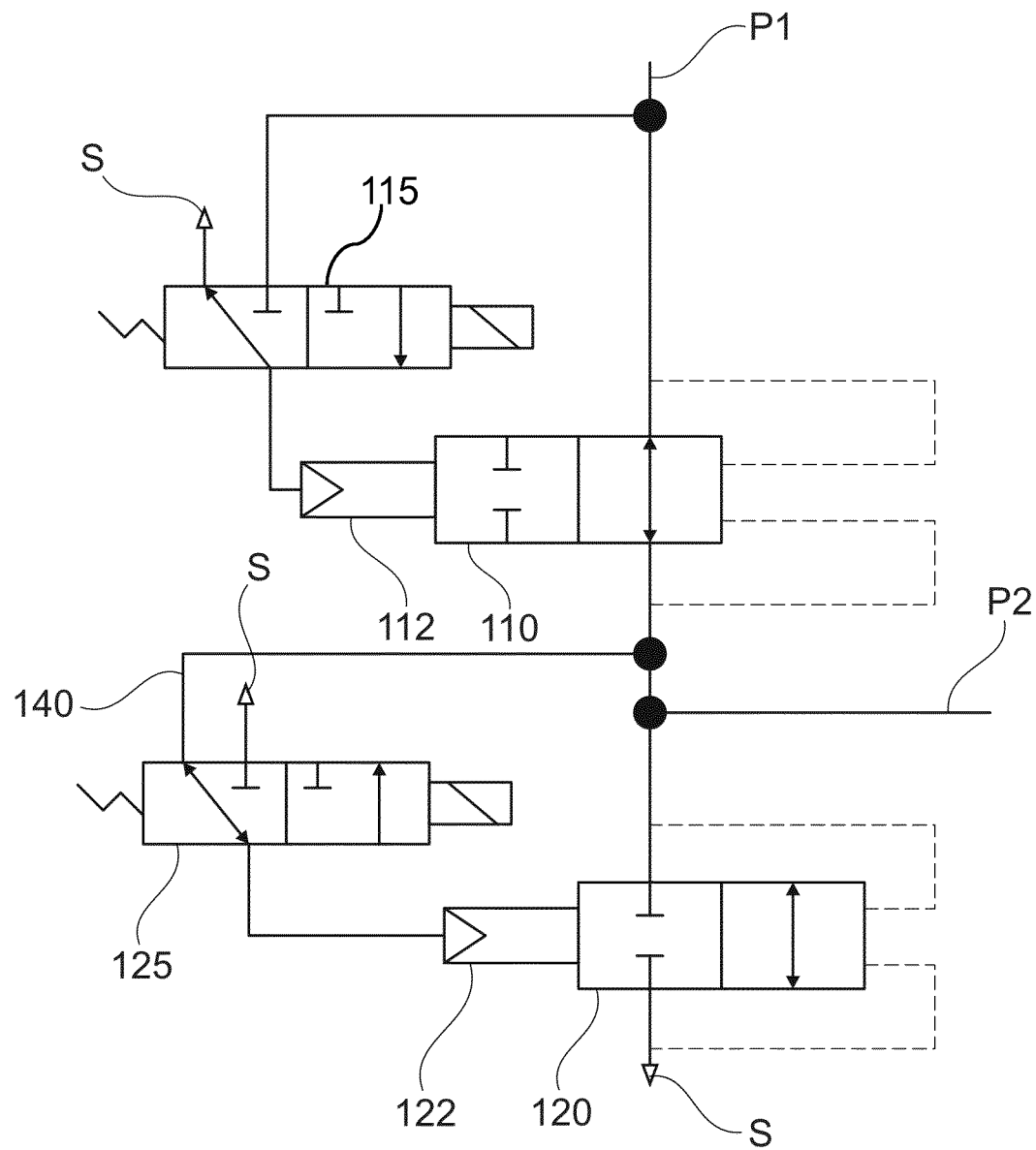
FIG. 1 shows a circuit diagram of a valve assembly for pressure control according to an exemplary embodiment of the present invention.

FIG. 1 shows a circuit diagram of a valve assembly for pressure control according to an exemplary embodiment of the present invention. As in the conventional valve assembly from FIG. 3A, a first valve 110 (for example a holding valve) and a second valve 120 (for example an outlet valve) are arranged in series between an input port P1 and a pressure sink S. The pressure sink S may have one or more openings to an environment or may include one or more areas with reduced pressure. The first valve 110 comprises a control input 112, which is connected to a first control valve 115. The first control valve 115 connects the control connection 112 of the first valve 110 either to the pressure sink S or to the input port P1. The second valve 120 also comprises a control input 122, which is controlled by a second control valve 125. The second control valve 125 connects the control connection 122 of the second valve 120 either to the pressure sink S or to the output port P2. The dashed lines are intended to indicate a possible direction through the first valve 110 and/or the second valve 120 when actuating the valve.

Figure 3A:
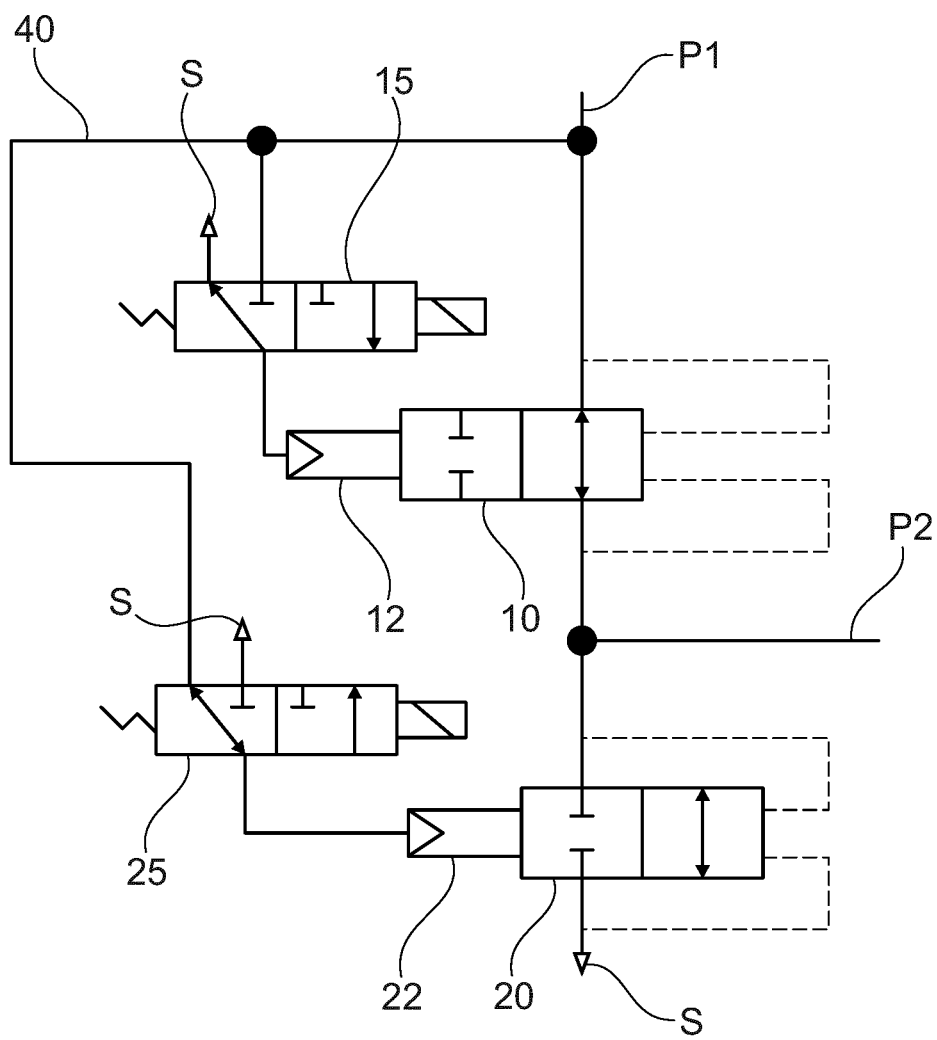
FIG. 3A shows a schematic diagram of a conventional valve assembly.

In contrast to the conventional valve assembly from FIG. 3A, a control pressure line 140 is present in exemplary embodiments which connects the output port P2 to the second control valve 125, so that the control pressure at the control input 22 is provided from the output port P2 and not from the input port P1.

The first control valve 115 and/or the second control valve 125 is/are for example (a) biased solenoid valve(s), which may have a particular position in a deenergized state. Thus, in the deenergized state the first control valve 115 connects the control connection 112 of the first valve 110 to the pressure sink S and in the energized state (activated state) connects the control connection 112 of the first valve 110 to the input port P1. In the deenergized state the second control valve 25 connects the control connection 122 of the second valve 120 to the output port P2 and in the activated state connects the control connection 122 of the second valve 120 to the pressure sink S.

In this way, a pressure at the input port P1 is forwarded through the first valve 110 to the output port P2 (if for example the brake is actuated). This connection can be interrupted or maintained by switching the first valve 110 through the control valve 115. In addition, the pressure at the output port P2 is directed through the second control valve 125 towards the control connection 122 of the second valve 120. As long as the second control valve 125 is not operated, the connection between the output port P2 and the pressure sink S remains interrupted and the brake pressure is maintained.

If the exemplary ABS is activated, the pressure at the output port P2 should be significantly reduced, at least temporarily. This is achieved by activating the second control valve 125 (it is energized), so that the control connection 122 at the second valve 120 is vented. This causes venting of the output port P2 by opening the connection to the pressure sink S through the second valve 120.

Figure 2:
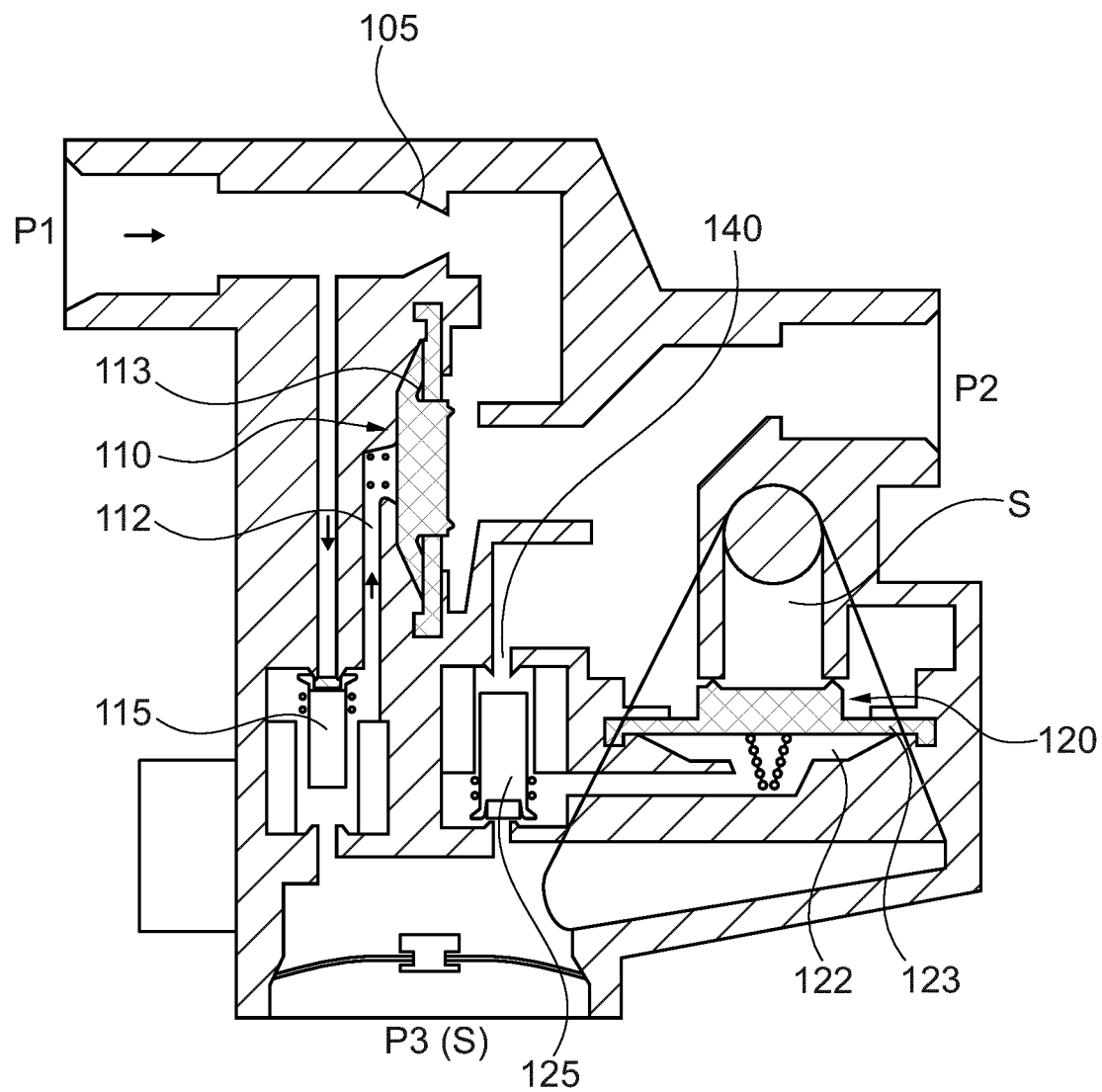
FIG. 2 shows a possible implementation of the valve assembly from FIG. 1.

FIG. 2 shows a possible specific implementation of the interconnection arrangement from FIG. 1, which in turn is similar to the implementation from FIG. 3A. Again, all pressure sinks S are connected to a venting port P3, which in turn can be connected to an external environment. As with the conventional implementation, the first valve 110 comprises a first membrane 113 and the second valve 120 comprises a second membrane 123. In addition, the implementation shown includes an optional choke 105 to limit the flow rate through the valve assembly to a desired value.

The first membrane 113 opens and/or closes the connection between the input port P1 and the output port P2, wherein this is dependent on a pressure at the control connection 112 of the first valve 110. If the control connection 112 of the first valve 110 is ventilated, the first valve closes 110, and if the control connection 112 is vented, the first valve opens 110.

The second membrane 123 opens and/or closes the connection between the output port P2 and the pressure sink S, wherein this is dependent on a pressure at the control connection 122 of the second valve 120. If the control connection 122 is ventilated, the second valve 120 closes the connection to the pressure sink S, and if the control connection 122 is vented, the second valve 120 opens the connection to the pressure sink S.

Figure 3B:
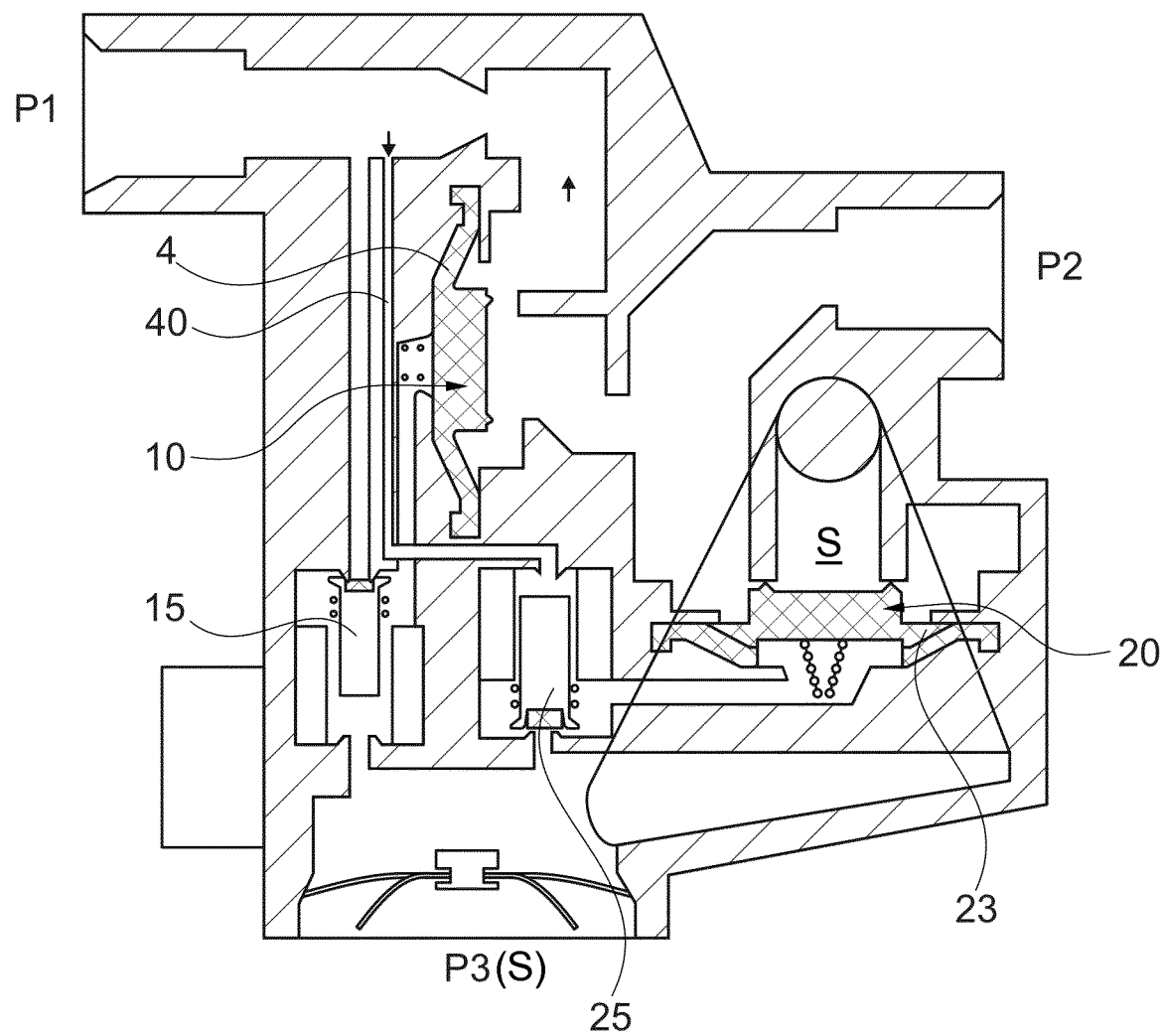
FIG. 3B shows an implementation of the conventional valve assembly.

All other components can be formed in the same way as with the conventional valve assembly from FIG. 3A or 3B.

In contrast to the conventional implementation from FIG. 3A, however, the control pressure line 140 is formed between the output port P2 and the second control valve 125 and the pressure at the output port P2 is used as a control pressure for ventilating the second valve 20—and not the pressure from the input port P1 as with the conventional arrangement.

The first control valve 115 is biased by a spring in such a way that it vents the control connection 112 of the first valve 110 in the deenergized state. Therefore, the first valve 110 will automatically open in the case of a positive pressure at the input port P1. The second control valve 125 is also biased by a spring so that it forwards the compressed air via the control pressure line 140 to the control connection 122 of the second valve 120 in the deenergized state. Therefore, the pressure from the output port P2 is continuously applied to the rear side of the second membrane 123.

If an intervention of the exemplary anti-lock braking system is to be carried out (the pressure at the output port P2 should be lowered, for example briefly or in a pulsed manner), this is done by opening the second valve 120, whereby the output port P2 is connected to the pressure sink S (P3). For this purpose, the second control valve 125 is briefly energized, which causes venting of the control connection 122, so that the second membrane 122 enables the opening to the pressure sink S.

Re-ventilation of the control connection 122 by deenergized switching of the second control valve 125 increases the pressure at the control connection 122 to the pressure from the output port P2. There are then equal pressures on both sides of the second membrane 123. However, since the second membrane 123 is biased (for example by a spring), in this case the second membrane 123 closes the opening to the pressure sink S. Here, the second membrane 123 closes an opening to a higher flow channel, which is connected to the pressure sink S at the venting port P3 via a funnel-shaped structure (shown only schematically in FIG. 2, since the connection is outside the plane of the drawing).

It is understood that the pressures and also the channel flows can be selected as desired, and the invention should not be limited to certain pressure conditions or channel flows.

An advantage of exemplary embodiments, however, is precisely that—regardless of the existing pressures—the same pressures are present on both sides of the second membrane 123 (approximately), namely the pressure from the output port P2. This significantly reduces the load on the second membrane 123 and extends the service life. There is a significantly lower load or lower stresses in the material and thus less damage in the components.

The features of the invention disclosed in the description, the claims and figures may be essential for the realization of the invention, both individually and in any combination.

THE REFERENCE CHARACTER LIST IS AS FOLLOWS 10, 110 First valve
12, 112 Control connection of the first valve
13, 113 First membrane
15, 115 First control valve
20, 120 Second valve
22, 122 Control connection of the second valve
23, 123 Second membrane
25, 125 Second control valve
40, 140 Control pressure lines
P1 Input port
P2 Output port
S, P3 Pressure sink/venting port

The invention claimed is:

1. A valve assembly for providing pressure control at an output port, comprising:
an input port and the output port;
a pressure sink;
a first valve, including a first membrane and a first control connection;
a second valve, including a second membrane and a second control connection, wherein the first valve and the second valve are arranged in series between the input port and the pressure sink and between which the output port branches off;
a first control valve to connect the first control connection to the input port or vents the first control connection to the pressure sink in a controllable manner; and
a second control valve to connect the second control connection to the output port or vents the second control connection to the pressure sink in a controllable manner;
wherein a control pressure line connects the output port to the second control valve, so that a control pressure at the second control input is provided from the output port,
wherein the pressure sink has at least one opening to an environment or at least one area having a reduced pressure,
wherein the first membrane and the second membrane are oriented perpendicularly to each other, and
wherein the first control valve and the second control valve are oriented parallel to each other and are oriented in opposite directions.

2. The valve assembly of claim 1, wherein the first control valve includes a solenoid valve, which vents the first control connection in the deenergized state, and wherein the second control valve includes a solenoid valve, which connects the second control connection to the output port in the deenergized state.

3. The valve assembly of claim 1, wherein the first valve includes the first membrane which opens or closes a connection between the input port and the output port when the first valve is actuated, and/or wherein the second valve includes the second membrane, which opens or closes a connection between the output port and the pressure sink when the second valve is actuated.

4. The valve assembly of claim 3, wherein the first membrane is biased to close the first valve in the case of no pressure at the input port, and/or wherein the second membrane is biased to close the second valve in the case of no pressure at the output port.

5. The valve assembly of claim 1, further comprising:
a choke that limits an inflow via the input port.

6. An anti-lock braking system for a vehicle brake, comprising:
a valve assembly for providing pressure control at an output port, wherein the output port is connectable to a brake cylinder of a brake of the vehicle, and wherein the valve assembly includes:

an input port and the output port;
a pressure sink;
a first valve, including a first membrane and a first control connection;
a second valve, including a second membrane and a second control connection, wherein the first valve and the second valve are arranged in series between the input port and the pressure sink and between which the output port branches off;
a first control valve to connect the first control connection to the input port or vents the first control connection to the pressure sink in a controllable manner; and
a second control valve to connect the second control connection to the output port or vents the second control connection to the pressure sink in a controllable manner;
wherein a control pressure line connects the output port to the second control valve, so that a control pressure at the second control input is provided from the output port,
wherein the pressure sink has at least one opening to an environment or at least one area having a reduced pressure,
wherein the first membrane and the second membrane are oriented perpendicularly to each other, and
wherein the first control valve and the second control valve are oriented parallel to each other and are oriented in opposite directions.

7. The valve assembly of claim 6, wherein an ABS intervention causes venting of the output port through the second valve so as to cause a brief releasing of the brake.

8. A commercial vehicle, comprising:
a valve assembly, including:
an input port and an output port;
a pressure sink;
a first valve, including a first membrane and a first control connection;
a second valve, including a second membrane and a second control connection, wherein the first valve and the second valve are arranged in series between the input port and the pressure sink and between which the output port branches off;
a first control valve to connect the first control connection to the input port or vents the first control connection to the pressure sink in a controllable manner; and
a second control valve to connect the second control connection to the output port or vents the second control connection to the pressure sink in a controllable manner;
wherein a control pressure line connects the output port to the second control valve, so that a control pressure at the second control input is provided from the output port,
wherein the pressure sink has at least one opening to an environment or at least one area having a reduced pressure,
wherein the first membrane and the second membrane are oriented perpendicularly to each other, and
wherein the first control valve and the second control valve are oriented parallel to each other and are oriented in opposite directions; and
an anti-lock braking system, including the valve assembly, for providing pressure control at the output port, wherein the output port is connectable to a brake cylinder of a brake of the vehicle.

9. A method for controlling a pressure at an output port by a valve assembly, the method comprising:
feeding a pressure via the input port through a first valve to an output port;
closing the first valve to maintain the pressure at the output port;
connecting the output port to a pressure sink through a second valve to lower the pressure at the output port; and
interrupting the connection of the output port to the pressure sink by controlling the second valve with the pressure at the output port;
wherein the valve assembly includes:
the input port and the output port;
the pressure sink;
the first valve, including a first membrane and a first control connection;
a second valve, including a second membrane and a second control connection, wherein the first valve and the second valve are arranged in series between the input port and the pressure sink and between which the output port branches off;
the first control valve to connect the first control connection to the input port or vents the first control connection to the pressure sink in a controllable manner; and
the second control valve to connect the second control connection to the output port or vents second first control connection to the pressure sink in a controllable manner;
wherein a control pressure line connects the output port to the second control valve, so that a control pressure at the second control input is provided from the output port,
wherein the pressure sink has at least one opening to an environment or at least one area having a reduced pressure,
wherein the first membrane and the second membrane are oriented perpendicularly to each other, and
wherein the first control valve and the second control valve are oriented parallel to each other and are oriented in opposite directions.

* * * * *